United States Patent
Jo

(10) Patent No.: US 11,208,011 B2
(45) Date of Patent: Dec. 28, 2021

(54) APPARATUS FOR CONTROLLING SEAT OF VEHICLE, SYSTEM HAVING THE SAME, AND METHOD THEREOF

(71) Applicants: HYUNDAI MOTOR COMPANY, Seoul (KR); KIA MOTORS CORPORATION, Seoul (KR)

(72) Inventor: Sung Jin Jo, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 86 days.

(21) Appl. No.: 16/802,761

(22) Filed: Feb. 27, 2020

(65) Prior Publication Data

US 2021/0107380 A1 Apr. 15, 2021

(30) Foreign Application Priority Data

Oct. 15, 2019 (KR) .......................... 10-2019-0128058

(51) Int. Cl.
*B60N 2/02* (2006.01)
*B60N 2/00* (2006.01)
*B60R 25/01* (2013.01)
*B60R 25/24* (2013.01)

(52) U.S. Cl.
CPC ............ *B60N 2/0244* (2013.01); *B60N 2/002* (2013.01); *B60R 25/01* (2013.01); *B60R 25/241* (2013.01); *B60N 2002/0268* (2013.01)

(58) Field of Classification Search
CPC ..... B60N 2/002; B60N 2/0244; B60N 2/0248; B60N 2002/0268; B60R 25/01; B60R 25/241
See application file for complete search history.

(56) References Cited

U.S. PATENT DOCUMENTS

| | | | |
|---|---|---|---|
| 9,434,349 B1* | 9/2016 | Perkins | ................... B60R 22/48 |
| 2002/0033297 A1* | 3/2002 | Ohki | ..................... B60N 2/0248 180/326 |
| 2006/0114101 A1* | 6/2006 | Schambeck | ........... B60R 25/241 340/5.61 |
| 2008/0001565 A1* | 1/2008 | Nakashima | .......... B60N 2/0244 318/568.1 |

(Continued)

FOREIGN PATENT DOCUMENTS

| | | | |
|---|---|---|---|
| CN | 210591484 U | * 5/2020 | |
| DE | 10345560 B4 | * 10/2006 | ....... B60R 21/01546 |

(Continued)

*Primary Examiner* — Babar Sarwar
(74) *Attorney, Agent, or Firm* — McDonnell Boehnen Hulbert & Berghoff LLP

(57) ABSTRACT

An apparatus for controlling a seat of a vehicle, a system having the same, and a method thereof are provided. The apparatus for controlling a seat of a vehicle includes a digital key positioning device to measure a position of a digital key inside the vehicle and the number of the digital key, an occupant sensor to sense an occupant condition inside the vehicle, a controller to determine a target for seat-controlling based on the position of the digital key, the number of the digital key, and the occupant condition, and a seat controller to control a position of a seat using seat control information, which is received from the digital key, for each user.

20 Claims, 12 Drawing Sheets

(56) References Cited

U.S. PATENT DOCUMENTS

| | | | | |
|---|---|---|---|---|
| 2011/0082625 | A1* | 4/2011 | Miller | B60R 21/01546 |
| | | | | 701/45 |
| 2012/0154136 | A1* | 6/2012 | Connelly, Jr. | G08B 21/24 |
| | | | | 340/457 |
| 2016/0379466 | A1* | 12/2016 | Payant | G08B 21/22 |
| | | | | 340/457 |
| 2018/0022231 | A1* | 1/2018 | Bennett | B60N 2/002 |
| | | | | 324/686 |
| 2018/0130327 | A1* | 5/2018 | Rogers | G08B 21/0222 |
| 2018/0290563 | A1* | 10/2018 | Minato | B60N 2/0727 |
| 2018/0326870 | A1* | 11/2018 | Presna | B60R 22/18 |
| 2019/0197468 | A1* | 6/2019 | Endo | H04L 63/102 |
| 2019/0202404 | A1* | 7/2019 | Atsumi | B60R 25/241 |
| 2021/0107380 | A1* | 4/2021 | Jo | B60R 25/01 |
| 2021/0162949 | A1* | 6/2021 | Arakawa | G06Q 30/0645 |

FOREIGN PATENT DOCUMENTS

| | | | | |
|---|---|---|---|---|
| DE | 102007026184 A1 | * | 1/2008 | B60N 2/3013 |
| EP | 0424783 A1 | * | 5/1991 | B62D 1/181 |
| WO | WO-2007113809 A2 | * | 10/2007 | B60N 2/002 |

\* cited by examiner

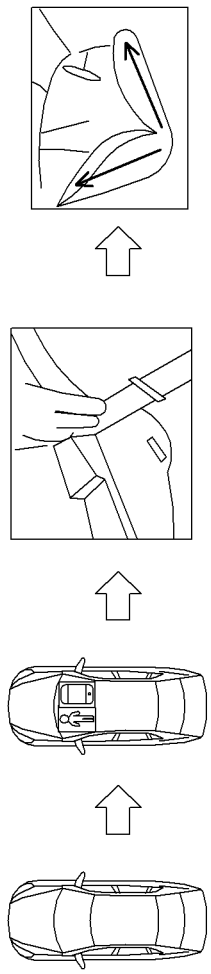

FIG. 7A

| INTERNAL CONDITION OF VEHICLE | OCCUPANT CONDITION | EXPECTED EFFECT |
|---|---|---|
| ONE DIGITAL KEY INSIDE VEHICLE | ONE DRIVER | - USER OF DIGITAL KEY = DRIVER<br>- START ON OF DRIVER → SEAT POSITION STORED IN DIGITAL KEY PROVIDED |
| ONE DIGITAL KEY INSIDE VEHICLE | ONE DRIVER, ONE OCCUPANT (ADULT OR KID) | - DIGITAL KEY USER = DRIVER<br>- DRIVER SEAT AUTOMATICALLY PROVIDED WHEN START ON % SEAT BELT ON REGARDLESS OF SEATING POSITION OF OCCUPANT 1 (ADULT) BECAUSE ONE DIGITAL KEY IS PROVIDED INSIDE VEHICLE |

FIG. 7B   FIG. 7C   FIG. 7D   FIG. 7E

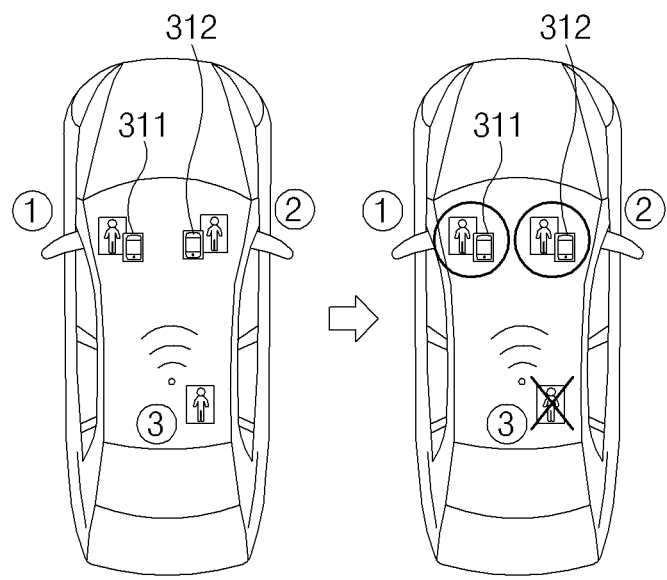

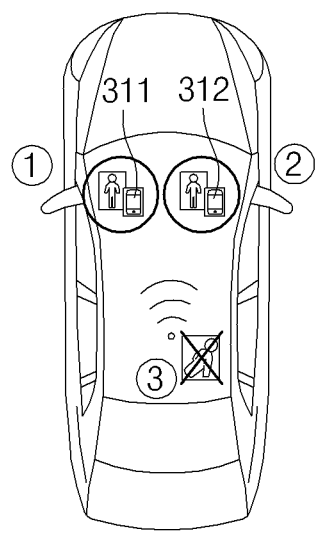
FIG. 9C
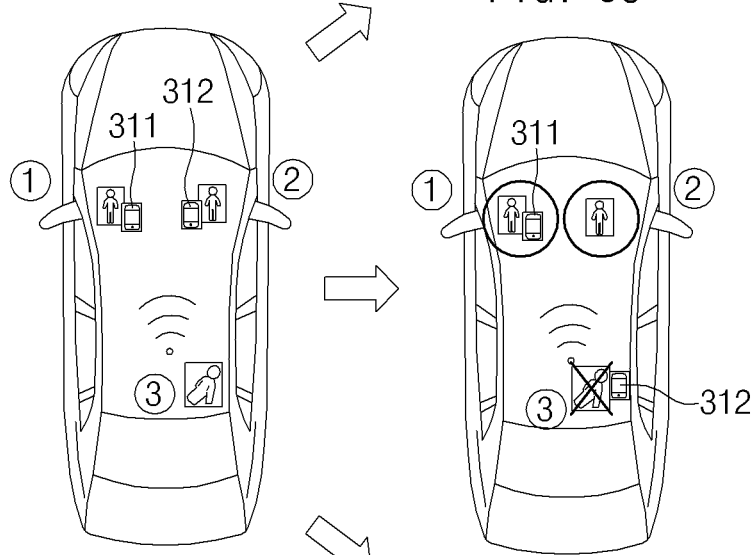
FIG. 9A
FIG. 9B
FIG. 9D
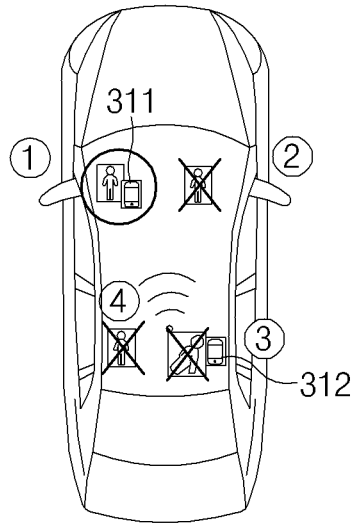
FIG. 9E

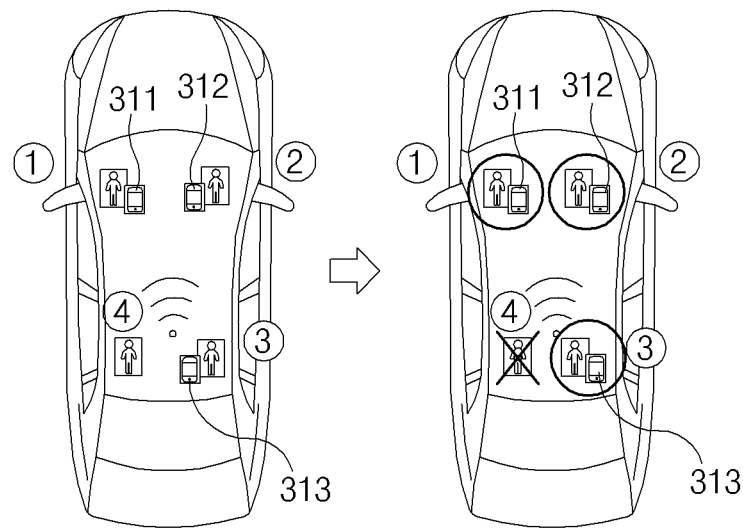

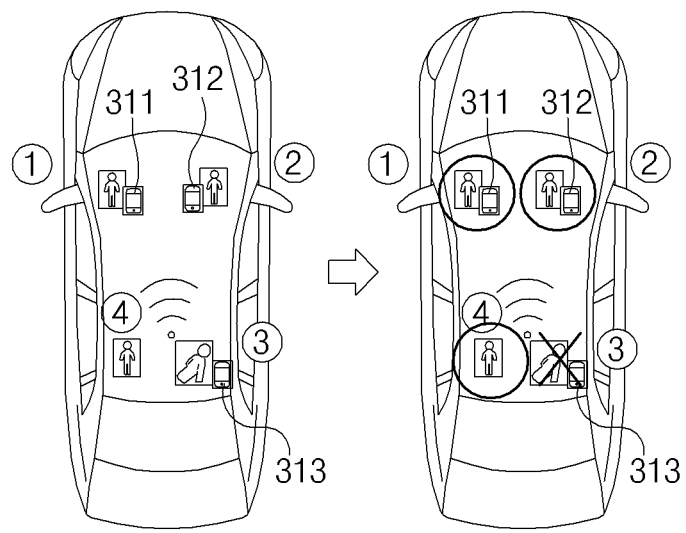

APPARATUS FOR CONTROLLING SEAT OF VEHICLE, SYSTEM HAVING THE SAME, AND METHOD THEREOF

CROSS-REFERENCE TO RELATED APPLICATION

This application claims the benefit of priority to Korean Patent Application No. 10-2019-0128058, filed in the Korean Intellectual Property Office on Oct. 15, 2019, the entire contents of which are incorporated herein by reference.

TECHNICAL FIELD

The present disclosure relates to an apparatus (vehicle seat controlling apparatus) for controlling a seat of a vehicle, a system having the same, and a method thereof, and more particularly, to a technology of moving a seat to a seat position, which is previously stored, for each occupant registered using a digital key.

BACKGROUND

In general, a vehicle seat is mounted inside a vehicle such that an occupant may comfortably go to a destination. In such a vehicle seat, a head rest, a seat back, and a seat cushion may be adjusted or a seat body may be adjusted back and forth, based on the height and the weight of the occupant.

Accordingly, conventionally, technologies have been developed on controlling seat positions only for occupants seated on a driver seat and a passenger seat, as the driver seat and the passenger seat are limitedly customized and the seat positions of the driver seat and the passenger seat are stored.

As described above, the conventional technology of controlling the seat position are limitedly provided for the driver seat and the front passenger seat.

SUMMARY

The present disclosure has been made to solve the above-mentioned problems occurring in the prior art while advantages achieved by the prior art are maintained intact.

An aspect of the present disclosure provides an apparatus for controlling a seat of a vehicle based on an internal vehicle condition (the number of a digital key and the position of the digital key) and an occupant condition (the classification and the position of an occupant), thereby providing the convenience of a user, a system having the same, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling a seat of a vehicle may include a digital key positioning device to measure a position of a digital key inside the vehicle and the number of the digital key, an occupant sensor to sense an occupant condition inside the vehicle, a controller to determine a target for seat-controlling based on the position of the digital key, the number of the digital key, and the occupant condition, and a seat controller to control a position of a seat using seat control information, which is received from the digital key, for each user.

According to an embodiment, the occupant condition may include at least one of the number of an occupant, a position of the occupant, or classification information of the occupant.

According to an embodiment, the controller may control, based on seat control information received from each digital key, a position of each seat at which the digital key is positioned, when the number of the digital key inside the vehicle is equal to the number of an occupant inside the vehicle, and when the position of the digital key inside the vehicle is matched to a position of the occupant inside the vehicle.

According to an embodiment, the controller may, when one digital key is provided inside the vehicle, and one occupant is present inside the vehicle, start the vehicle using the digital key inside the vehicle.

According to an embodiment, the controller may determine whether a seat belt of a seat, on which the occupant is seated, is fasten after the vehicle stared, and control a position of the seat, on which the occupant is seated, based on seat control information received from the digital key.

According to an embodiment, the controller may, when the number of occupants inside the vehicle is larger than the number of the digital key inside the vehicle, determine whether the occupant is one of an object, an adult, and a kid.

According to an embodiment, the controller may, when at least two digital keys are provided inside the vehicle, when the number of occupants inside the vehicle is larger than the number of the digital key inside the vehicle, and when the occupants are all adults, control a position of an occupant seat at which the digital key is positioned.

According to an embodiment, the controller may, when at least two digital keys are provided inside the vehicle, when the number of occupants inside the vehicle is larger than the number of the digital key inside the vehicle, and when a kid is included in the occupants, determine the target for seat-controlling based on the position of the digital key.

According to an embodiment, the controller may, when the digital key is positioned in a seat on which an adult of the occupants is seated, control a position of the seat on which the adult is seated.

According to an embodiment, the controller may, when the digital key is positioned in a seat on which the kid of the occupants is positioned, control the position of the seat on which the adult is positioned, when the number of the digital key is equal to the number of the adult.

According to an embodiment, the controller may, when the number of the digital key is larger than the number of the adult, control a position of a driver seat.

According to an embodiment, the controller may, when occupants are seated on a driver seat, a passenger seat, and one side of seats in a rear row, when digital keys are provided in the driver seat and the passenger seat, and when adults are seated on the driver seat and the passenger seat, control a position of the driver seat based on seat control information received from a digital key positioned in the driver seat and control a position of the passenger seat based on seat control information from a digital key positioned in the passenger seat.

According to an embodiment, the controller may, when occupants are seated on a driver seat, a passenger seat, and a seat positioned at one side of seats in a rear row, when digital keys are provided in the driver seat and the passenger seat, when adults are seated on the driver seat and the passenger seat, and when a kid is seated on the one side of the seats in the rear row, control a position of the driver seat based on seat control information received from the digital key positioned in the driver seat, and control a position of the passenger seat based on seat control information from the digital key positioned on the one side of the seats in the rear row.

According to an embodiment, the controller may, when occupants are seated on a driver seat, a passenger seat, and opposite seats in a rear row, when digital keys are provided at the driver seat and at one side of the seats in the rear row, when adults are seated on the driver seat and the passenger seat, and when a kid is seated at the one side of the seats in the rear row, control a position of the driver seat based seat control information received from a digital key positioned in the driver seat.

According to an embodiment, the occupant sensor may determine whether an occupant is an adult or a kid, based on one of a weight, a sitting height, and a breathing rate.

According to an embodiment, the controller may perform user authentication to open a door of the vehicle in access of the digital key.

According to another aspect of the present disclosure, a vehicle system may include a digital key to make communication with a vehicle to transmit or receive information on opening a vehicle door and information on starting the vehicle, and a vehicle seat controlling apparatus to measure a position of a digital key inside the vehicle and the number of the digital key inside the vehicle, to sense an occupant condition in the vehicle, to determine a target for seat-controlling based on the position of the digital key, the number of the digital key, and the occupant condition, and to control a position of the seat using seat control information, which is received from the digital key, each user.

According to an embodiment, the digital key may download, from an external server, the seat control information for the each user.

According to an embodiment, the digital key may make Ultra Wide Band (UWB) communication with the vehicle and the vehicle seat-controlling apparatus.

According to another aspect of the present disclosure, a method for controlling a seat of a vehicle includes measuring a position of a digital key inside the vehicle and the number of the digital key inside the vehicle, sensing an occupant condition inside the vehicle, determining a target for seat-controlling based on the number of the digital key, the position of the digital key, and the occupant condition, and controlling a position of the seat using seat control information, which is received from the digital key, for each user.

BRIEF DESCRIPTION OF THE DRAWINGS

The above and other objects, features and advantages of the present disclosure will be more apparent from the following detailed description taken in conjunction with the accompanying drawings:

FIGS. 7A, 7B, 7C, 7D, and 7E are views illustrating the procedure of controlling a vehicle sheet when one digital key is provided, according to an embodiment of the present disclosure;

FIGS. 8A, 8B, and 8C are views illustrating the procedure of controlling a vehicle seat when two digital keys are provided and two occupants are present in addition to a driver, according to an embodiment of the present disclosure;

FIGS. 9A, 9B, 9C, 9D, and 9E are views illustrating the procedure of controlling a vehicle seat when two digital keys are provided and three occupants are present, according to an embodiment of the present disclosure;

FIGS. 10A, 10B, and 10C are views illustrating the procedure of controlling a vehicle seat when three digital keys are provided and four occupants are present, according to an embodiment of the present disclosure;

FIGS. 11A, 11B, and 11C are views illustrating the procedure of controlling a vehicle seat when three digital keys are provided and four occupants including a kid are present, according to an embodiment of the present disclosure.

DETAILED DESCRIPTION

Figure 1:
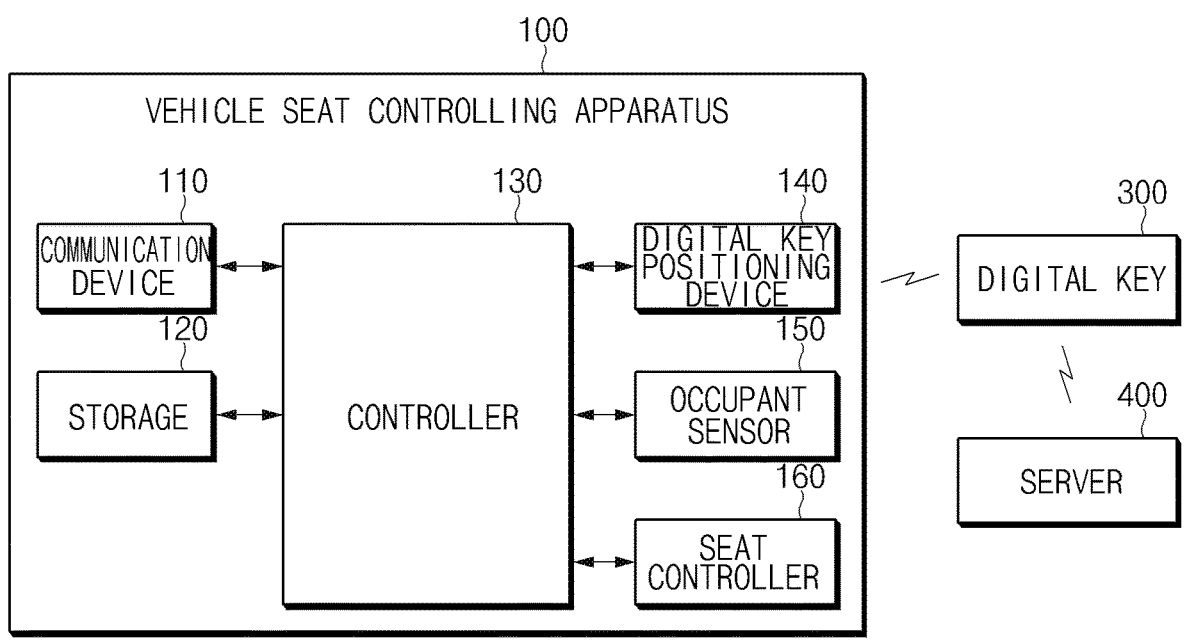
FIG. 1 is a block diagram illustrating the configuration of a vehicle system including a vehicle seat controlling apparatus, according to an embodiment of the present disclosure.

Hereinafter, some embodiments of the present disclosure will be described in detail with reference to the exemplar)/drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure discloses a technology of controlling the position of a vehicle seat based on the auto start and the information on the stored seat position for each passenger using the digital key.

Hereinafter, embodiments of the disclosure will be described in detail with reference to FIGS. 1 to 12.

Figure 2:
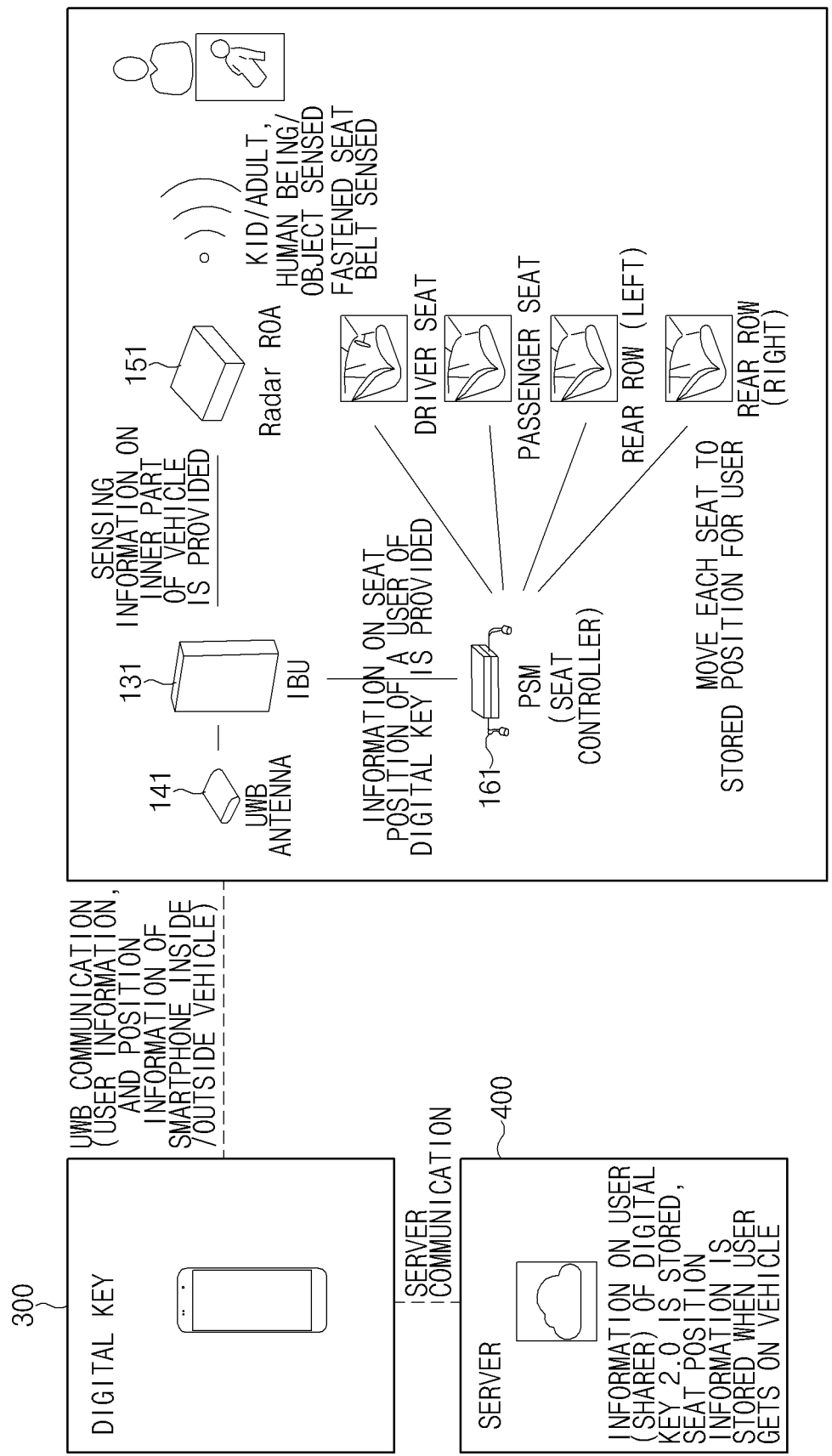
FIG. 2 is a view illustrating the detailed whole configuration of a vehicle system, according to an embodiment of the present disclosure.
Figure 3:
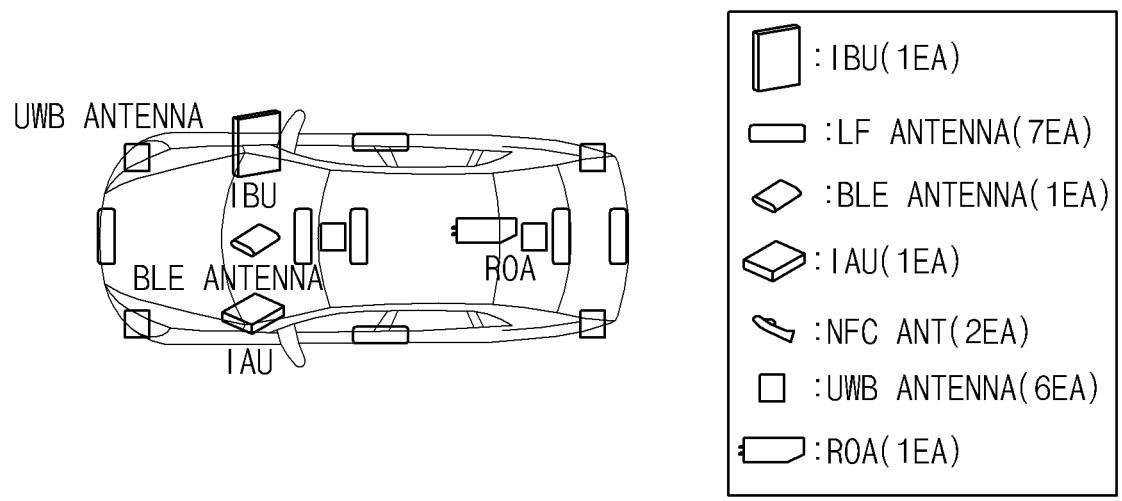
FIG. 3 is a view illustrating a vehicle seat controlling apparatus mounted in a vehicle, according to an embodiment of the present disclosure.

FIG. 1 is a block diagram illustrating the configuration of a vehicle seat controlling apparatus, according to an embodiment of the present disclosure, FIG. 2 is a view illustrating the detailed whole configuration of the vehicle system, according to an embodiment of the present disclosure, and FIG. 3 is a view illustrating the vehicle seat controlling apparatus mounted in a vehicle, according to an embodiment of the present disclosure.

Referring to FIG. 1, according to an embodiment of the present disclosure, a vehicle system includes a vehicle seat controlling apparatus 100, a digital key 300, and a server 400.

According to an embodiment of the present disclosure, the vehicle seat controlling apparatus 100 may be implemented inside the vehicle. In this case, the vehicle seat controlling apparatus 100 may be formed integrally with the internal control units of the vehicle or may be implemented separately from the internal control units of the vehicle to be connected with the internal control units of the vehicle through a separate connector.

The vehicle seat controlling apparatus 100 controls the position of a driver seat based on seat control information received from a digital key positioned in the driver seat and control the position of a passenger seat based on seat control information from a digital key positioned in the passenger seat, when occupants are seated on the driver seat, the passenger seat, and one side of seats in a rear row, when the digital keys are provided in the driver seat and the passenger seat, and when adults are seated on the driver seat and the passenger seat.

To this end, the vehicle seat controlling apparatus 100 includes a communication device 110, a storage 120, a controller 130, a digital key positioning device 140, an occupant sensor 150, and a seat controller 160.

In this case, according to an embodiment of the present disclosure, the communication device 110, the storage 120, the controller 130, the digital key positioning device 140, the occupant sensor 150, and the seat controller 160, which are included in the vehicle seat controlling apparatus 100, may be implemented with at least one processor.

The communication device 110 is a hardware device implemented with various electronic circuits to transmit and receive a signal through wireless or wired connection. In this case, the vehicle network communication technology may include a controller area network (CAN) communication technology, a local interconnect network (LIN) communication technology, a FlexRay communication technology, and in-vehicle communication may be performed through the above communication technology.

In addition, the communication device 110 may be in wireless communication with an external server of the vehicle and a digital key 300. In this case, the communication device 110 may perform a wireless Internet or short range communication technology. In this case, the wireless Internet technology may include a wireless LAN (MILAN), a wireless broadband (Wibro), a Wi-Fi, World Interoperability for Microwave Access (Wimax). The short range communication technology may include Ultra-Wide Band (UWB), Bluetooth, ZigBee, Radio Frequency Identification (RFID), or infrared data association (IrDA).

The storage 120 may store data and/or algorithms necessary for the controller 130 to operate. For example, the storage 120 may store information for user identification with the digital key 300.

The storage 120 may be implemented with at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, and/or an optical disk-type memory.

The controller 130 may process signals transmitted between the components of the vehicle seat controlling apparatus 100. The controller 130 may be electrically connected with the communication device 110, the storage 120, and the like, may electrically control each component, and may be an electric circuit that executes software commands. Accordingly, the controller 130 may perform various data processing and calculation, to be described below.

The controller 130 performs the introduction and the withdrawal of the digital key 300, and the user authentication, and transmits the seat control information from the digital key 300 to the controller 160. In addition, the controller 130 may perform the user authentication to open a vehicle door in access of the digital key 300.

The controller 130 may determine a target for seat-controlling based on the position of the digital key 300, the number of the digital key 300, and an occupant condition. In this case, the occupant condition may include at least one of the number of an occupant, the position of the occupant, or the classification information of the occupant.

When the number of the digital key 300 inside the vehicle is equal to the number of an occupant inside the vehicle, and when the position of the digital key 300 is matched to the position of the occupant inside the vehicle, the controller 130 may control the position of each seat in which the digital key 300 is positioned, based on seat control information received from each digital key.

When one digital key 300 is provided inside the vehicle, and one occupant is present inside the vehicle, the controller 130 may perform vehicle starting using the digital key 300 inside the vehicle.

After the vehicle is started, the controller 130 may determine whether the seat belt of the passenger is fastened and control the position of the seat on which an occupant is seated, based on the seat control information received from the digital key 300.

When the number of occupants is larger than the number of a digital key inside the vehicle, the controller 130 may determine whether the occupant is any one of an object, an adult, or a kid.

When at least two digital keys are provided inside the vehicle, when the number of the occupants inside the vehicle is larger than the number of the digital keys, and when the occupants are all adults, the controller 130 may control the position of an occupant seat at which the digital key is positioned.

When at least two digital keys are provided inside the vehicle, when the number of the occupants inside the vehicle is larger than the number of the digital keys, and when a kid is included in the occupants, the controller 130 may determine the target for seat-controlling, based on the position of the digital key.

The controller 130 may control a position of a seat on which an adult is seated, when the digital key is positioned at the position of the seat on which the adult is seated.

The controller 130 may control the position of a seat on which an adult is seated, when a digital key is positioned in a seat on which a kid of occupants is seated, and when the number of digital keys is equal to the number of adults.

The controller 130 may control the position of the driver seat, when the number of adults is larger than the number of the digital keys 30.

The controller 130 controls the position of a driver seat based on seat control information received from a digital key positioned in the driver seat and control the position of a passenger seat based on seat control information from a digital key positioned in a passenger seat, when occupants are seated on the driver seat, the passenger seat, and one side of seats in a rear row, when the digital keys are provided in the driver seat and the passenger seat, and when adults are seated on the driver seat and the passenger seat.

The controller 130 controls the position of a driver seat based seat control information received from a digital key positioned in the driver seat and control the position of a passenger seat based on seat control information received from a digital key positioned at one side of the seats in the rear row, when occupants are seated on the driver seat, the passenger seat, and one side of the seats in a rear row, when the digital keys are provided in the driver seat and the one side of the seats in the rear row, when adults are seated on the driver seat and the passenger seat, and when a kid is seated at one side of the seats in the rear row.

When occupants are seated on the driver seat, the passenger seat, and opposite seats in a rear row, when digital keys are present at the driver seat and at one side of the seats in the rear row, when adults are seated on the driver seat and the passenger seat, and when a kid is seated at the one side of the seats in the rear row, the controller 130 may control the position of the driver seat based on seat control information received from the digital key positioned at the driver seat.

For example, the controller 130 may be implemented with an integrated body unit (IBU) 131 as illustrated in FIG. 2.

The digital key positioning device 140, which measures the position of the digital key 300, provides a user position and user information to the occupant sensor 150 and the seat controller 160.

For example, the digital key positioning device 140 may be implemented with an UWB antenna 141 as illustrated in FIG. 2, and may receive and transmit user information or information on the position of a digital key through UWB communication.

The occupant sensor 150 may recognize an object and a human being inside the vehicle by distinguishing between the object and the human being, and may sense whether the human being is an adult or a kid, based on one of a weight, a sitting height, and a breathing rate. In addition, the occupant sensor 150 may sense an object or a human being inside the vehicle for a specific time (for example, about 5-10 seconds), and determine whether the occupant fastens a seat belt.

For example, the occupant sensor 150 may be implemented with a rear occupant alert (ROA) device 151, a weight measuring sensor or a key measuring sensor. As illustrated in FIG. 3, the ROA may be positioned at the center of the rear seat of the vehicle.

The ROA 151 may sense whether the occupant is a human being, an object, a kid, or an adult through wireless communication, sense whether the occupant fasten a seat belt, and provide the sensing result to the IBU 131.

The seat controller 160 controls a seat to automatically move by receiving the position of a digital key user and seat control information received from the controller 130. For example, the seat controller 160 may be implemented with a PSM (Power Seat Module) 161 as illustrated in FIG. 2, and adjust the positions of the driver seat, the occupant seat, a left seat in the rear row, and a right seat in the rear row.

The digital key 300, which is an authentication tool used by a vehicle user to use the vehicle, may transmit and receive information for opening the vehicle door and starting the vehicle with the vehicle. The digital key 300 may be a user terminal and may be implemented in the form of a portable terminal such as a smartphone that may be connected to the vehicle and the server 400 through a network.

The digital key 300 may receive seat control information for each user from an external server and may provide the seat control information to the vehicle. In this case, the portable terminal, which is a wireless communication device to ensure portability and mobility, may include all types of handheld-based wireless communication devices, such as Personal Communication System (PCS), Global System for Mobile communications (GSM), Personal Digital Cellular (PDC), Personal Handyphone System (PHS), Personal Digital Assistant (PDA), International Mobile Telecommunication (IMT)-2000, Code Division Multiple Access (CDMA)-2000, W-Code Division Multiple Access (W-CDMA), a Wireless Broadband Internet (WiBro) terminal, a Smart Phone, a tablet personal computer (PC), a mobile phone, a video conference, an e-book reader, a netbook computer, and a wearable device such as a watch, a ring, a bracelet, an anklet, a necklace, glasses, a contact lens, or a head-mounted-devices (HMD). The digital key 300 is installed with a vehicle interworking application for transmitting and receiving the seat position information for each user together with the server 400. The vehicle interworking application may be downloaded through wireless communication or the Internet, and may be automatically installed after downloaded.

The server 400 may store the seat position information for each user and may provide the seat position information to the digital key 300 when receiving a request for the seat position information from the digital key 300.

According to the present disclosure, a user may get on or get off on the vehicle and start the vehicle through a digital key without using a hand, and may recognize the number of digital keys and exact positions of the digital keys inside the vehicle.

In addition, according to the present disclosure, it is possible to detect the position of an occupant, the number of the occupant, and the classification of the occupant (an adult, a kid, or an object) on the vehicle through an ROA-based internal vehicle sensor.

Therefore, according to the present disclosure, the position of each seat may be exactly adjusted using the number of digital keys, the exact positions of the digital keys, the positions of the occupants in the vehicle, the number of the occupants, and the classification of the occupants, thereby increasing the convenience of the occupant.

Therefore, according to the present disclosure, when a digital key user, who has used the vehicle, gets on a vehicle with a smartphone, and starts the vehicle, the digital key user may obtain a previous seat position without personally moving the seat regardless of seating positions.

Figure 4:
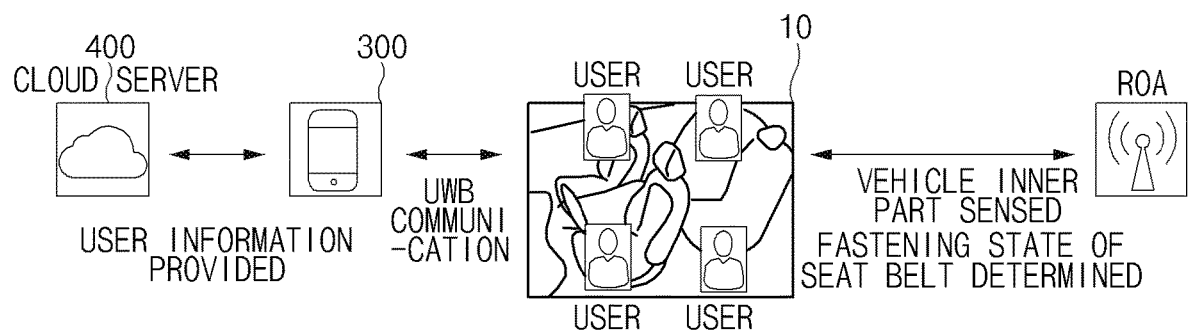
FIG. 4 is a schematic view illustrating the procedure of controlling a vehicle seat, according to an embodiment of the present disclosure.

FIG. 4 is a schematic view illustrating the procedure of controlling a vehicle seat, according to an embodiment of the present disclosure.

Referring to FIG. 4, the vehicle 10 performs UWB communication with the digital key 300, and receives the sensing result of the interior of the vehicle and the determination result of the fastening state of a seat belt, from the ROA.

The vehicle 10 may control a vehicle seat for each occupant based on the number and the position of the digital key 300, the number of an occupant, the type of the occupant, and the position of the occupant. The vehicle 10 may control the vehicle seat for each occupant using vehicle seat information included in user information received from the server 400 (cloud server) through the digital key 300.

Figure 5:
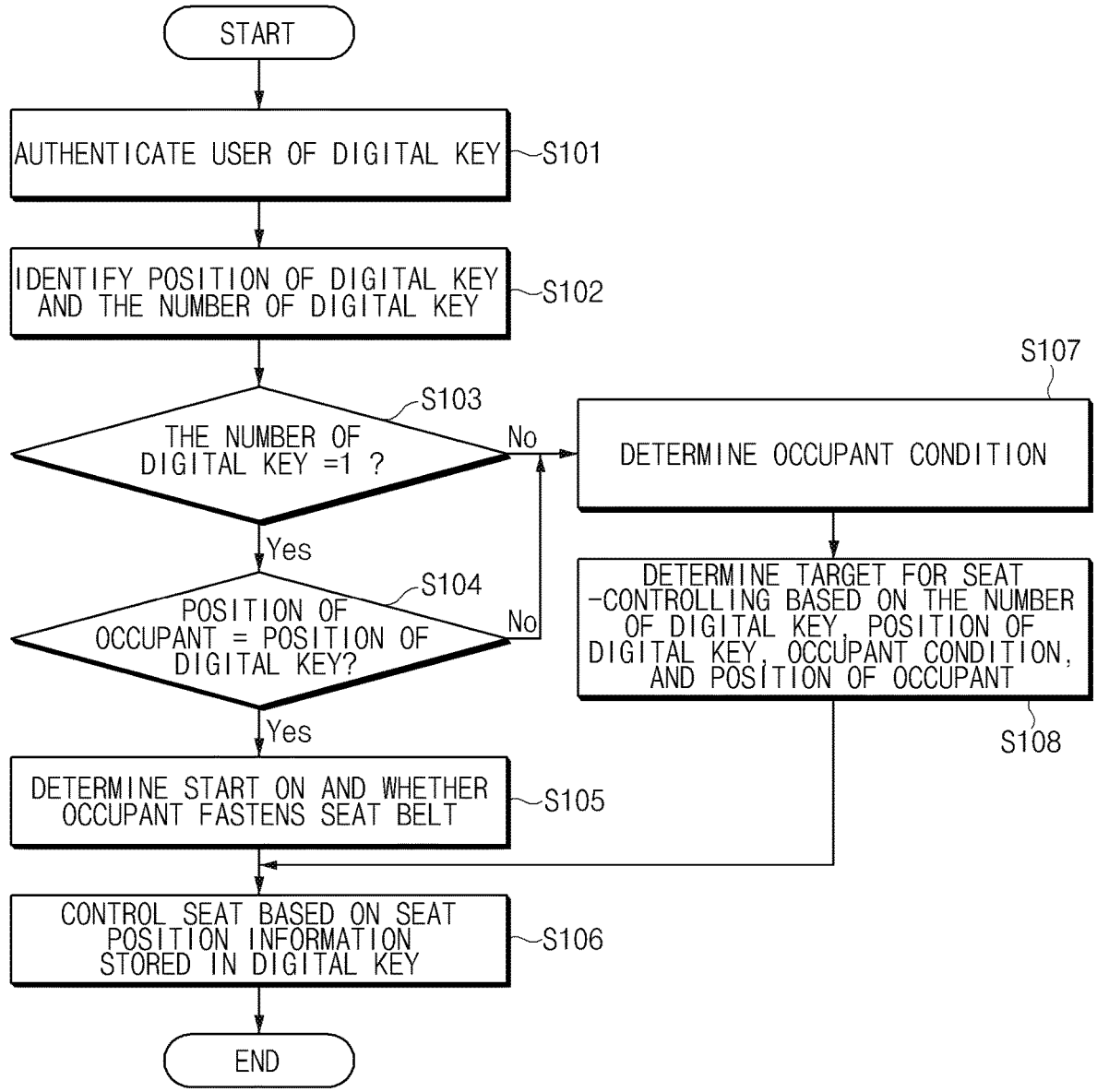
FIG. 5 is a flowchart illustrating a method for controlling a vehicle seat, according to an embodiment of the present disclosure.

Hereinafter, a method for controlling a vehicle seat according to an embodiment of the present disclosure will be described in detail with reference to FIG. 5. FIG. 5 is a flowchart illustrating the method of controlling a vehicle seat, according to an embodiment of the present disclosure.

Hereinafter, it is assumed that the vehicle seat controlling apparatus 100 of FIG. 1 performs a processor of FIG. 5. In addition, in the following description made with reference to FIG. 5, it may be understood that the operation described as being performed by the vehicle seat controlling apparatus 100 is controlled by the controller 130 of the vehicle seat controlling apparatus 100.

Referring to FIG. 5, the vehicle seat controlling apparatus 100 authenticates a digital key user when the digital key 300 approaches the vehicle (S101).

When the digital key user is successfully authenticated, the vehicle seat controlling apparatus 100 identifies the position and the number of a digital key inside the vehicle (S102). The vehicle seat controlling apparatus 100 may identify the positions and the number of the digital key inside the vehicle by making the UBW communication with the digital key after the user gets on the vehicle.

Accordingly, the vehicle seat controlling apparatus 100 determines whether the number of the digital key 300 is 1 (S103) and the number of an occupant inside the vehicle is equal to the number of a digital key 300 (S104).

The vehicle seat controlling apparatus 100 determines whether an occupant fastens a seat belt after the vehicle is started, when the number of an occupant inside the vehicle is equal to the number of the digital keys 300 (S105). In this case, the vehicle seat controlling apparatus 100 may determine whether the occupant fastens the seat belt, based on the ROA.

Thereafter, the vehicle seat controlling apparatus 100 controls the seat position based on the seat position information, which is previously stored, of the digital key received from the digital key (S106). In this case, the digital key receives the seat position information from the server 400 and transmits the seat position information to the vehicle seat controlling apparatus 100.

Meanwhile, when at least two digital keys are provided in operation S103, the vehicle seat controlling apparatus 100 determines an occupant condition (S107). The occupant condition may include the position of an occupant, the number of the occupant, and the classification of the occupant (an object, an adult, or a kid).

Accordingly, the vehicle seat controlling apparatus 100 determines a target for seat-controlling based on the number of the digital key, the position of the digital key, and the occupant condition (S108), and controls the seat based on seat position information, which is previously stored, of each digital key (S106).

Figures 6A, 6B:
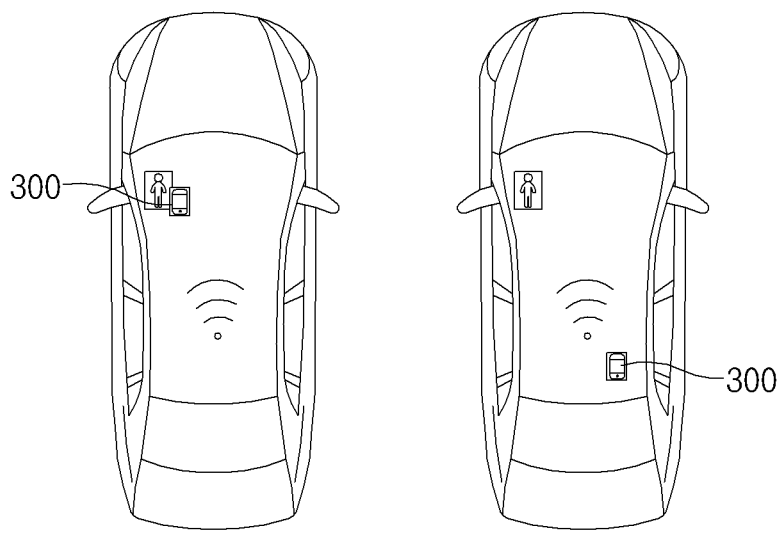
FIGS. 6A and 6B are views illustrating that one occupant is present inside a vehicle and one digital key is provided inside the vehicle, according to an embodiment of the present disclosure.

FIGS. 6A and 6B are views illustrating that one occupant is present inside a vehicle and one digital key is present inside the vehicle, according to an embodiment of the present disclosure.

Referring to reference numeral FIG. 6A, when one occupant is present inside the vehicle, and one digital key is provided inside the vehicle, when the position of the digital key inside the vehicle is matched to a seating position of the occupant who has registered the digital key, the vehicle seat controlling apparatus 100 determines that the occupant, who has registered the digital key, is a driver, determines whether the occupant fastens the seat belt after starting the vehicle, and controls the position of the relevant seat based on the previously-stored seat control information when the occupant fastens the seat belt.

Referring to reference numeral FIG. 6B, when one occupant is present inside the vehicle and one digital key is provided in the vehicle, and when the position of the digital key inside the vehicle is different from the seating position of the occupant who has registered the relevant digital key, the vehicle seat controlling apparatus 100 may sense the occupant condition, determine the target for seat-controlling, and control the seat after the occupant is determined as fastening the seat belt.

The detailed procedure of determining the target for seat-controlling based on the occupant condition, the number of digital key, and the position of the digital key will be described with reference to FIGS. 7 to 11.

FIGS. 7A-7E are views illustrating the procedure of controlling a vehicle seat when one digital key is provided, according to an embodiment of the present disclosure.

Referring to FIG. 7A, when one digital key 300 is provided inside the vehicle, and one occupant is seated on a driver seat, and when the position of the digital key is matched to the position of the occupant, the vehicle seat controlling apparatus 100 determines that the occupant is determined as a driver who has registered the digital key.

In addition, when one digital key 300 is provided inside the vehicle and two occupants are sensed, and when one of the two occupants is an adult and a remaining one of the two occupants is a kid, the vehicle is started on regardless of the position of the adult of the occupants, it is determined that the seat belts are fastened, and the driver seat is automatically moved and adjusted based on the seat control information which is previously stored. In this case, the digital key positioned in the driver seat is involved in starting the vehicle.

In other words, as in FIG. 7B, when a user having the digital key approaches the vehicle, an access authentication and a user authentication are performed. The authentications are successful, so a vehicle door is open, and the user gets on the vehicle as in FIG. 7C. In this case, it may be recognized that the position of the digital key is matched to the position of the occupant. When the seat belt of the driver seat is fastened as in FIG. 7D, the driver seat is controlled based on the seat control information, which is previously stored, as in FIG. 7E.

FIGS. 8A-8C are views illustrating the procedure of controlling a vehicle seat when two digital keys are provided and two occupants are present in addition to a driver, according to an embodiment of the present disclosure.

Hereinafter, seat controlling will be described with reference to FIG. 8A, when two digital keys are sensed inside the vehicle and two adults are sensed as occupants in addition to one driver.

As shown in FIG. 8B, when three occupants on a driver seat, a passenger seat, and a right seat in a rear row are sensed, and when digital keys are present only in the driver seat and the passenger seat, the vehicle seat controlling apparatus 100 senses whether three occupants are adults, kids, or objects. Then, when three occupants are all adults, the vehicle is started on based on the digital key positioned in the driver seat and it is determined whether the seat belt of each seat is fastened. When the seat belts are determined as being fastened as FIG. 8C, the vehicle seat controlling apparatus 100 controls the driver seat and the passenger seat having digital keys 311 and 312. In other words, the vehicle seat controlling apparatus 100 may control the driver seat based on the seat control information received from the digital key of the driver, and may control the passenger seat based on the seat control information received from the digital key of the passenger. In this time, the seat in the rear row, at which the occupant is seated, may not be controlled because a digital key is absent in the seat.

FIGS. 9A-9E are view illustrating the procedure of controlling a vehicle seat when two digital keys are provided and three occupants are present, according to an embodiment of the present disclosure.

Referring to FIG. 9A, when two digital keys are present in the vehicle and when occupants are seated on the driver seat, the passenger seat, and the seat in the rear row, the vehicle seat controlling apparatus 100 measures the position of each digital key, and senses whether the occupants are adults, kids, or objects.

As in FIG. 9B, when the digital keys are present in the driver seat and the passenger seat, and when an occupant seated on the seat in the rear row is a kid, the vehicle seat controlling apparatus 100 determines whether the seat belts of the driver seat and the passenger seat are fastened.

As in FIG. 9C, when the digital keys 311 and 312 are positioned in the driver seat and the passenger seat, respectively, the vehicle seat controlling apparatus 100 may control the position of the driver seat based on the seat control information received from the digital key of the driver seat and may control the position of the passenger seat based on the seat control information received from the digital key of the passenger seat.

When an image is shown to the kid through a smartphone serving as the digital key 313, the vehicle seat controlling operation is performed as in FIG. 9D or 9E.

In FIG. 9D, when digital keys are provided in the driver seat and the seat in the rear row, and a digital key is absent in the passenger seat, the vehicle seat controlling apparatus 100 determines the user of a digital key, through which the kid seated on the seat in the rear row views an image, as an occupant seated on the passenger seat. Accordingly, the vehicle seat controlling apparatus 100 controls the position of the driver seat based on the seat control information received from the digital key of the driver seat and may control the seat of the passenger seat based on the seat control information received from the digital key positioned at the seat in the rear seat.

FIG. 9E illustrates the case that four occupants including a kid are present in total. In this case, digital keys are positioned in the driver seat and the right seat in the rear row, at which occupants are seated, and digital keys are absent in the passenger seat and the left seat in the rear row. In this case, it may not be determined whether the user of the digital key positioned in the right seat in the rear row is the occupant at the passenger seat or at the left set in the rear row. Accordingly, the vehicle seat controlling apparatus 100 may control only the position of the driver seat based on the seat control information received from the digital key at the driver seat and may not control the positions of the passenger seat and the left seat in the rear row.

FIGS. 10A-10C are views illustrating the procedure of controlling a vehicle seat when three digital keys are provided and four occupants are present, according to an embodiment of the present disclosure.

As FIGS. 10A and 10B, three digital keys 311, 312, and 313 are provided inside a vehicle, and all occupants are seated at the driver seat, the passenger seat, the left seat in the rear row, and the right seat in the rear row and are adults.

As in FIG. 10C, the digital keys are positioned at the driver seat, the passenger seat, and the right seat in the rear row, respectively, so the vehicle seat controlling apparatus 100 determines whether a seat belt of each seat is fastened after the vehicle is started on. Then, the vehicle seat controlling apparatus 100 may control the position of the driver seat based on the seat control information received from the digital key at the driver seat, may control the position of the passenger seat based on the seat control information received from the digital key at the passenger seat, and may control the position of the right seat in the rear row based on the seat control information received from the digital key of the right seat in the rear row.

FIGS. 11A-11C are views illustrating the procedure of controlling a vehicle seat when three digital keys are provided and four occupants including a kid are present, according to an embodiment of the present disclosure.

Referring to FIG. 11A, when three digital keys are provided inside a vehicle and four occupants including one kid are present, as in FOG. 11B, digital keys 311, 312, and 313 are positioned at a driver seat, a passenger seat, and a right seat in a rear seat in the state that adults are seated at the driver seat, the passenger seat, and the left seat in a rear row, and the kid is seated at the right seat in a rear row.

The vehicle seat controlling apparatus 100 determines that the adult seated at the left seat in the rear row is a user of the digital key 313 positioned at the right seat, on which the kid is seated, in the rear row. As in FIG. 11C, the vehicle seat controlling apparatus 100 may determine whether a seat belt of each seat is fastened after the vehicle is started on. Thereafter, the vehicle seat controlling apparatus 100 may control the position of the driver seat based on the seat control information received from the digital key at the driver seat, may control the position of the passenger seat based on the seat control information received from the digital key at the passenger seat, and may control the position of the left seat in the rear row based on the seat control information received from the digital key of the right seat in the rear row.

As described above, according to the present disclosure, the seat is controlled using seat control information registered for each digital key under the internal vehicle condition (the position of a digital key and the number of digital keys) and an occupant condition (the number of an occupant, the position of the occupant, and the classification of the occupant), thereby increasing the convenience of the occupant.

Figure 12:
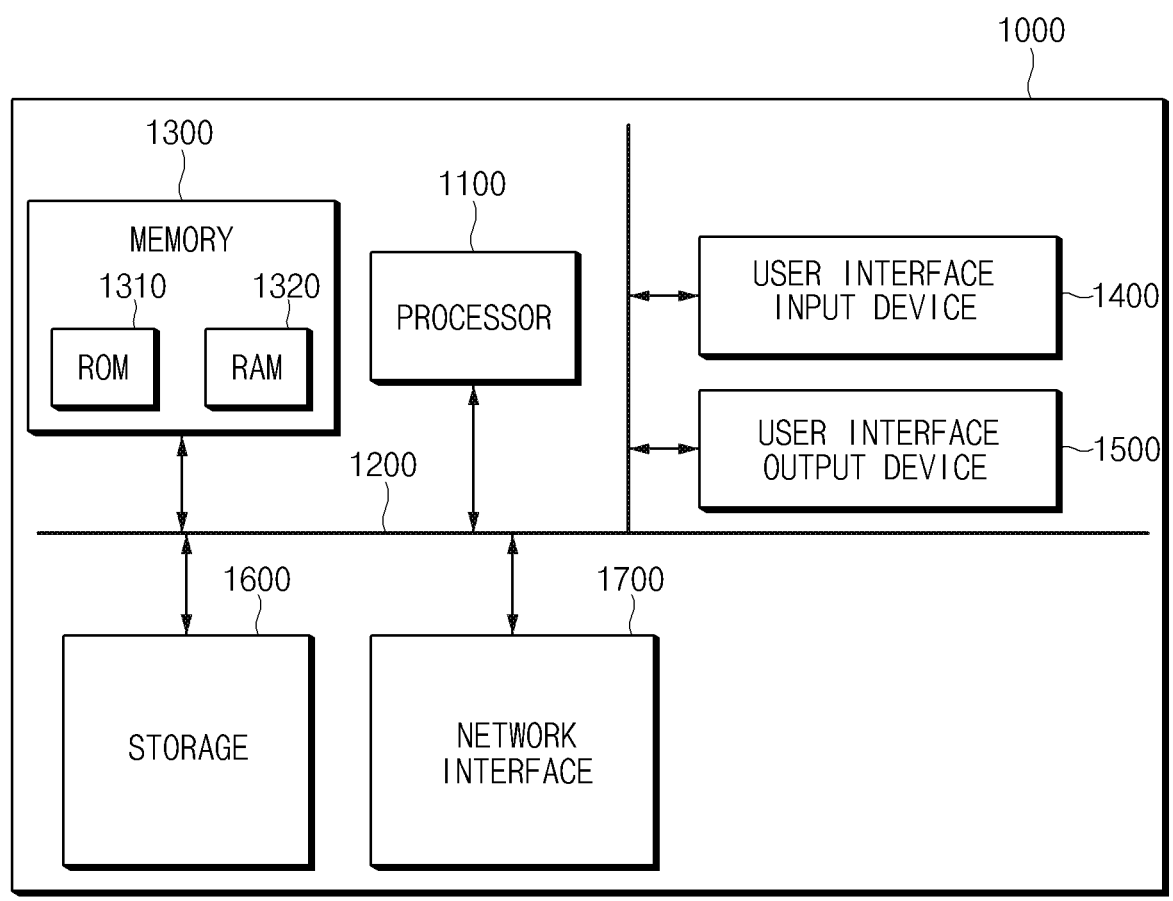
FIG. 12 illustrates a computing system, according to an embodiment of the present disclosure.

FIG. 12 illustrates a computing system, according to an embodiment of the present disclosure.

Referring to FIG. 12, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) 1310 and a random access memory (RAM) 1320.

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and the storage medium may reside as separate components of the terminal of the user.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

According to the present technology, the seat of the vehicle may be controlled based on the internal vehicle condition (the number of a digital key and the positions of the digital key) and an occupant conditions (the classification and the position of an occupant), thereby providing the convenience of the user.

Besides, a variety of effects directly or indirectly understood through the disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling a seat of a vehicle, the apparatus comprising:
    a digital key positioning device configured to measure a position of a digital key inside the vehicle and a number of digital keys;
    an occupant sensor configured to sense an occupant condition inside the vehicle;
    a controller configured to determine a target for seat-controlling based on the position of the digital key, the number of digital keys, and the occupant condition; and
    a seat controller configured to control a position of a seat using seat control information, which is received from the digital key, for a user;
    wherein the seat controller is configured to:
        when the number of digital keys in the vehicle is two or more, control a first seat in which a first digital key is positioned using a first seat control information which is received from the first digital key, and control a second seat in which a second digital key is positioned using a second set control information which is received from the second digital key.

2. The apparatus of claim 1, wherein the occupant condition includes:
    at least one of the number of an occupant, a position of the occupant, or classification information of the occupant.

3. The apparatus of claim 1, wherein the controller is configured to:
    control, based on seat control information received from each digital key, a position of each seat at which the digital key is positioned,
    when the number of the digital keys inside the vehicle is equal to the number of an occupant inside the vehicle, and
    when the position of the digital key inside the vehicle is matched to a position of the occupant inside the vehicle.

4. The apparatus of claim 1, wherein the controller is configured to:
    when one digital key is provided inside the vehicle, and one occupant is present inside the vehicle, start the vehicle using the digital key inside the vehicle.

5. The apparatus of claim 4, wherein the controller is configured to:
    determine whether a seat belt of a seat, on which the occupant is seated, is fastened after the vehicle is started; and
    control a position of the seat, on which the occupant is seated, based on seat control information received from the digital key.

6. The apparatus of claim 1, wherein the controller is configured to:
    when the number of occupants inside the vehicle is larger than the number of the digital keys inside the vehicle,
    determine whether the occupant is one of an object, an adult, and a kid.

7. The apparatus of claim 1, wherein the controller is configured to:
    when at least two digital keys are provided inside the vehicle,
    when the number of occupants inside the vehicle is larger than the number of the digital keys inside the vehicle, and
    when the occupants are all adults, control a position of an occupant seat at which the digital key is positioned.

8. The apparatus of claim 1, wherein the controller is configured to:
    when at least two digital keys are provided inside the vehicle,
    when the number of occupants inside the vehicle is larger than the number of the digital keys inside the vehicle, and
    when a kid is included in the occupants, determine the target for seat-controlling based on the position of the digital keys.

9. The apparatus of claim 8, wherein the controller is configured to:
    when the digital key is positioned in a seat on which an adult of the occupants is seated,
    control a position of the seat on which the adult is seated.

10. The apparatus of claim 8, wherein the controller is configured to:
    when the digital key is positioned in a seat on which the kid of the occupants is positioned,
    control the position of the seat on which an adult is positioned, when the number of the digital keys is equal to the number of adults.

11. The apparatus of claim 10, wherein the controller is configured to:
when the number of the digital keys is larger than the number of adults,
control a position of a driver seat.

12. The apparatus of claim 1, wherein the controller is configured to:
when occupants are seated on a driver seat, a passenger seat, and one side of seats in a rear row,
when digital keys are provided in the driver seat and the passenger seat, and
when adults are seated on the driver seat and the passenger seat,
control a position of the driver seat based on seat control information received from a digital key positioned in the driver seat; and
control a position of the passenger seat based on seat control information from a digital key positioned in the passenger seat.

13. The apparatus of claim 1, wherein the controller is configured to:
when occupants are seated on a driver seat, a passenger seat, and a seat positioned at one side of seats in a rear row,
when digital keys are provided in the driver seat and the passenger seat,
when adults are seated on the driver seat and the passenger seat, and
when a kid is seated on the one side of the seats in the rear row,
control a position of the driver seat based on seat control information received from the digital key positioned in the driver seat; and
control a position of the passenger seat based on seat control information from the digital key positioned on the one side of the seats in the rear row.

14. The apparatus of claim 1, wherein the controller is configured to:
when occupants are seated on a driver seat, a passenger seat, and opposite seats in a rear row,
when digital keys are provided at the driver seat and at one side of the seats in the rear row,
when adults are seated on the driver seat and the passenger seat, and
when a kid is seated at the one side of the seats in the rear row,
control a position of the driver seat based seat control information received from a digital key positioned in the driver seat.

15. The apparatus of claim 1, wherein the occupant sensor determines whether an occupant is an adult or a kid, based on one of a weight, a sitting height, and a breathing rate.

16. The apparatus of claim 1, wherein the controller is configured to:
perform user authentication to open a door of the vehicle in access of the digital key.

17. A vehicle system comprising:
a digital key configured to make communication with a vehicle to transmit or receive information on opening a vehicle door and information on starting the vehicle; and
a vehicle seat controlling apparatus configured to:
measure a position of a digital key inside the vehicle and a number of digital keys inside the vehicle;
sense an occupant condition in the vehicle;
determine a target for seat-controlling based on the position of the digital key, the number of the digital keys, and the occupant condition; and
control a position of the seat using seat control information, which is received from a digital key user;
wherein the vehicle seat controlling apparatus is configured to:
when the number of digital keys in the vehicle is two or more, control a first seat in which a first digital key is positioned using a first seat control information which is received from the first digital key, and control a second seat in which a second digital key is positioned using a second seat control information which is received from the second digital key.

18. The vehicle system of claim 17, wherein the digital key downloads, from an external server, the seat control information for the digital key user.

19. The vehicle system of claim 17, wherein the digital key makes Ultra Wide Band (UWB) communication with the vehicle and the vehicle seat-controlling apparatus.

20. A method for controlling a seat of a vehicle, the method comprising:
measuring a position of a digital key inside the vehicle and a number of digital keys inside the vehicle;
sensing an occupant condition inside the vehicle;
determining a target for seat-controlling based on the number of the digital keys, the position of the digital key, and the occupant condition; and
controlling a position of the seat using seat control information, which is received from a digital key user;
wherein controlling a position of the seat includes:
when the number of digital keys is two or more, controlling a first seat in which a first digital key is positioned using a first seat control information which is received from the first digital key, and controlling a second seat in which a second digital key is positioned using a second seat control information which is received from the second digital key.

* * * * *